United States Patent
Kellman et al.

(10) Patent No.: US 7,408,552 B2
(45) Date of Patent: Aug. 5, 2008

(54) SYSTEM AND METHOD FOR REPRESENTATION OF AIRCRAFT ALTITUDE USING SPATIAL SIZE AND OTHER NATURAL PERCEPTUAL CUES

(75) Inventors: Philip J. Kellman, Pacific Palisades, CA (US); Timothy C. Clausner, Los Angeles, CA (US); Evan M. Palmer, Venice, CA (US)

(73) Assignee: Raytheon Company, Waltham, MA (US)

( * ) Notice: Subject to any disclaimer, the term of this patent is extended or adjusted under 35 U.S.C. 154(b) by 564 days.

(21) Appl. No.: 10/071,670

(22) Filed: Feb. 8, 2002

(65) Prior Publication Data

US 2003/0151630 A1   Aug. 14, 2003

(51) Int. Cl.
*G06T 11/20*   (2006.01)
*G05D 1/00*   (2006.01)
(52) U.S. Cl. .......................................... 345/440; 701/4
(58) Field of Classification Search ......... 345/835–839, 345/418–419, 581, 473, 440; 715/835–839; 701/4
See application file for complete search history.

(56) References Cited

U.S. PATENT DOCUMENTS

| | | | |
|---|---|---|---|
| 3,611,371 A | | 10/1971 | Morse |
| 5,179,377 A | * | 1/1993 | Hancock .................... 340/961 |
| 5,210,540 A | * | 5/1993 | Masumoto ............. 342/357.11 |
| 5,227,786 A | * | 7/1993 | Hancock .................... 340/961 |
| 5,751,289 A | * | 5/1998 | Myers ........................ 345/419 |
| 5,845,874 A | * | 12/1998 | Beasley ...................... 244/1 R |
| 6,285,926 B1 | * | 9/2001 | Weiler et al. .................. 701/4 |
| 6,433,729 B1 | * | 8/2002 | Staggs .......................... 342/29 |
| 6,549,161 B1 | * | 4/2003 | Woodell .................. 342/26 R |
| 6,804,585 B2 | * | 10/2004 | Humbard et al. ............... 701/3 |

FOREIGN PATENT DOCUMENTS

EP   493822   7/1992

OTHER PUBLICATIONS

Azuma, R.; Neely III, H.; Daily, M.; Geiss, R. "Visualization Tools for Free Flight Air-Traffic Management." IEEE Computer Graphics and Applications, Sep./Oct. 2000. pp. 32-35, vol. 20, Issue: 5, ISSN: 0272-1716.*

(Continued)

*Primary Examiner*—Ryan R Yang
(74) *Attorney, Agent, or Firm*—Daly, Crowley, Mofford & Durkee, LLP

(57) ABSTRACT

A system for conveying location of an object by varying a characteristic such as size, color, or intensity of an icon located in a two dimensional display. In the illustrative embodiment, the invention represents aircraft altitude by the size of an icon. Each aircraft position and heading is plotted as location and orientation of the icon in two-dimensional space, the axes of which represent latitude and longitude. The size of the icon is selected from a limited number of discriminably different sizes to represent the aircraft altitude. Each size represents a distinct altitude range.

14 Claims, 3 Drawing Sheets

OTHER PUBLICATIONS

Johnston, J.; Horlitz, K.; Edmiston, R. "Improving Situation Awareness Displays for Air Traffic Controllers". Proceedings of the Seventh International Symposium on Aviation Psychology, 1993, Columbus, Ohio. pp. 328-334.*

Nowell, Lucille Terry. "Graphical Encoding for Information Visualization: Using Icon Color, Shape, and Size to Convey Nominal and Quantative Data." PhD Dissertation Nov. 7, 1997, Virginia Tech CS department, pp. 1-84.*

Feibush, E.; Gagvani, N.; Williams, D. "Visualization for Situational Awareness." IEEE Comp. Graphics and Apps. Sep./Oct. 2000, pp. 38-45.*

PCT Search Report dated Jun. 5, 2003; PCT Application No. PCT/US03/03234 filed on Feb. 4, 2003; Forms PCT/ISA/220 and PCT/ISA/210.

* cited by examiner

SYSTEM AND METHOD FOR REPRESENTATION OF AIRCRAFT ALTITUDE USING SPATIAL SIZE AND OTHER NATURAL PERCEPTUAL CUES

BACKGROUND OF THE INVENTION

1. Field of the Invention

The present invention relates to display systems. More specifically, the present invention relates to systems and methods for displaying three-dimensional information on a two-dimensional display.

2. Description of the Related Art

In air traffic control, it is critically important to maintain vertical and horizontal separation between aircraft. To assist in this endeavor, aircraft location and heading is displayed to an air traffic controller. The air traffic controller continuously monitors the air space and searches for potential conflicts; that is, simultaneous occupation of a volume of airspace (e.g., two aircraft that have less than 3 miles of horizontal separation or less than 300 feet of vertical separation).

Presently, air traffic controllers typically use plan view displays, which represent the position of each aircraft with an icon plotted in two-dimensional space (i.e., latitude and longitude). The altitude of each aircraft is displayed as a number in a data block associated with the aircraft icon. In order to detect potential conflicts in vertical separation, the human observer is required to find the numbers associated with an aircraft icon, read the numerical altitude, then numerically compute pairwise aircraft separations. This is cognitively demanding.

Alternatively, air traffic controllers use elevational displays of aircraft altitude. These displays use the y-axis in a two-dimensional display to directly represent aircraft vertical height. Elevational displays, however, do not convey aircraft position (latitude and longitude) and are therefore seldom used.

Computer conflict detection algorithms are available which endeavor to automatically detect and predict air traffic conflicts. These algorithms, however, fall short of providing a level of performance and accuracy sufficient to eliminate the need for an air traffic controller. The problem is computationally intense and the most sophisticated algorithms are currently unable to solve the problem within the time constraints of the application.

Further, in view of the risks, air traffic control will involve a human controller for the foreseeable future notwithstanding the availability of an adequate automated system.

Hence, a need remains in the art for an improved system or method for facilitating vertical separation of aircraft in a controlled environment.

SUMMARY OF THE INVENTION

The need in the art is addressed by the present invention, which provides a system for conveying location of an object by varying a characteristic such as size, shape, color, or intensity of an icon located in a two dimensional display. In the illustrative embodiment, the invention represents aircraft altitude by the size of an icon. Each aircraft position and heading is plotted as location and orientation of the icon in two-dimensional space, the axes of which represent latitude and longitude. The size of the icon is selected from a limited number of discriminably different sizes to represent the aircraft altitude. Each size represents a distinct altitude range.

Visualizing aircraft altitude using the spatial size of icons is a more effective means of identifying altitude ranges and detecting potential collisions. This takes advantage of human perceptual ability to discriminate size among many objects in a visual scene and perform rapid analog comparisons, as opposed to reading digital numbers and making several numerical comparisons. Conflicts can thus be anticipated with far less cognitive demand.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
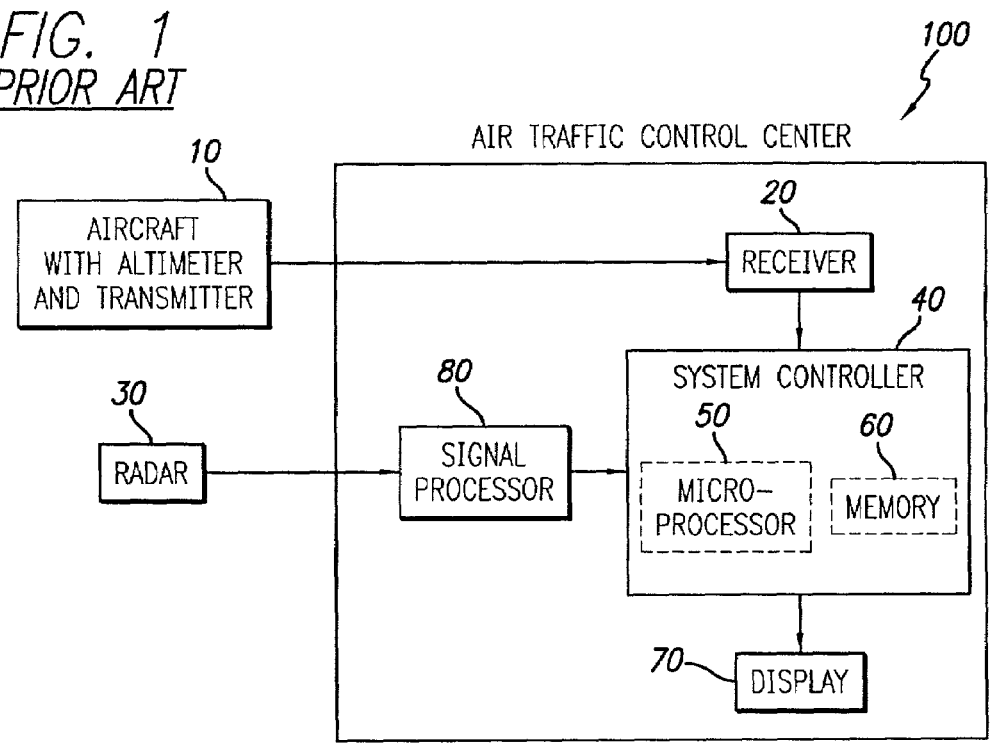
FIG. 1 is a block diagram of a system for conveying aircraft altitude of conventional design and construction.

FIG. 1 is a block diagram of an air traffic control system 100 of conventional design and construction. Aircraft 10 with an on-board altimeter and transmitter sends altitude information to a receiver 20 at the air traffic control center. Alternatively, altitude information may be obtained from a radar 30, which is processed by a signal processor 80. The altitude information is sent to a system controller 40, which includes a microprocessor 50 and memory 60. Software residing in the system memory 60 and executed by the microprocessor 50 evaluates the altitude information and conveys it to a human observer via a display 70.

Presently, air traffic controllers typically use plan view displays, which represent the position of each aircraft with an icon plotted in two-dimensional space (i.e. latitude and longitude). See FIG. 2 below.

Figure 2:
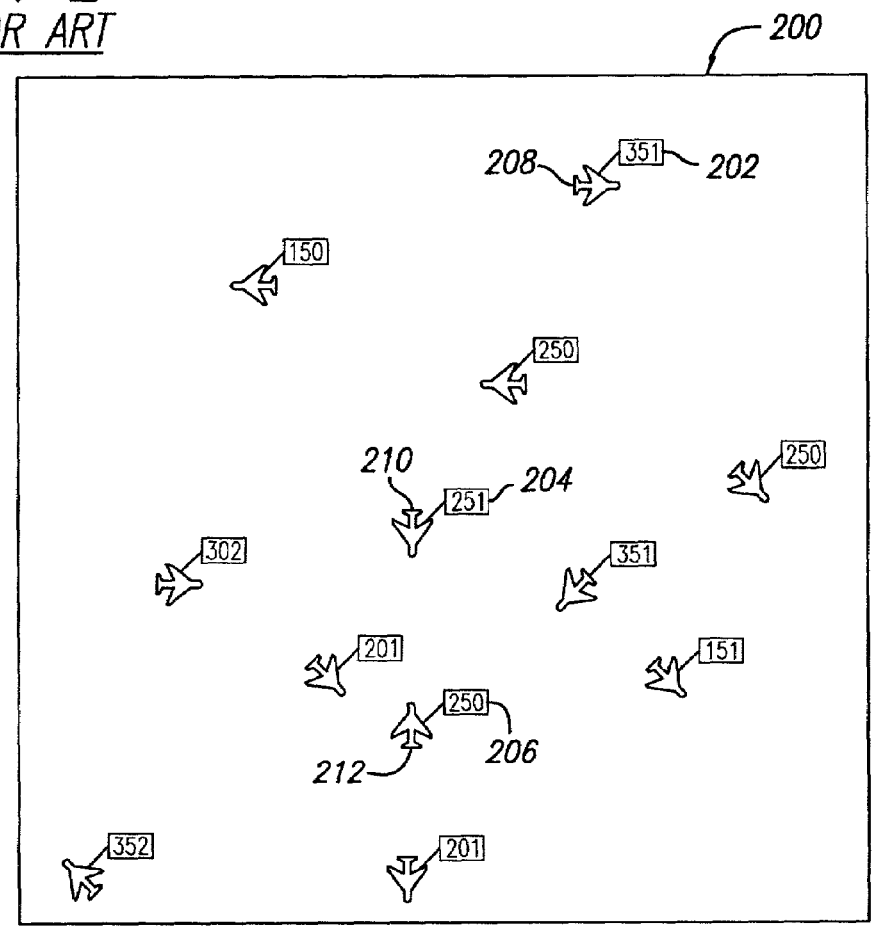
FIG. 2 is a simulated plan view display of conventional design and construction.

FIG. 2 is a simulated plan view of a conventional air traffic control display 200. Each aircraft position and heading is plotted as location and orientation of an icon 208, 210, 212, etc., in a two dimensional space, the axes of which represent latitude and longitude. The altitude of each aircraft is displayed as a number in a data block 202, 204, 206, etc. with the associated aircraft icon 208, 210, 212, etc., respectively. The number indicates hundreds of feet above sea level. In order to detect potential conflicts in vertical separation, the air traffic controller is required to find the numbers associated with an aircraft icon, read the numerical altitude, then numerically compute pairwise aircraft separations. This is cognitively demanding. For example, aircraft icons 210 and 212 represent a conflict. Detecting this conflict among the combinations of many other aircraft icons, which do not represent conflicts, is cognitively demanding.

The present invention improves upon the conventional plan view display by representing each aircraft with an icon having a size that is proportional to the altitude of the aircraft. As with traditional plan view displays, each aircraft position and heading is plotted as the location and orientation of the icon in a two-dimensional space, the axes of which represent latitude and longitude. In the preferred embodiment, the size of the icon is selected from a limited number of discriminably different sizes to represent the aircraft altitude. Each size represents a distinct altitude range. Numerical representations of altitude can be added for verification and more precise awareness of altitude.

Those skilled in the art will appreciate that a continuously variable relationship between icon size and altitude could be employed without departing from the scope of the present teachings. In this particular embodiment, discrete sizes were chosen because of the nature of the application. Presently, aircraft altitudes are assigned in discrete levels. Mapping the discrete altitude ranges to discrete icon sizes is a natural solution. For other applications, it may be more useful to have a continuously adjustable icon size.

Figure 3:
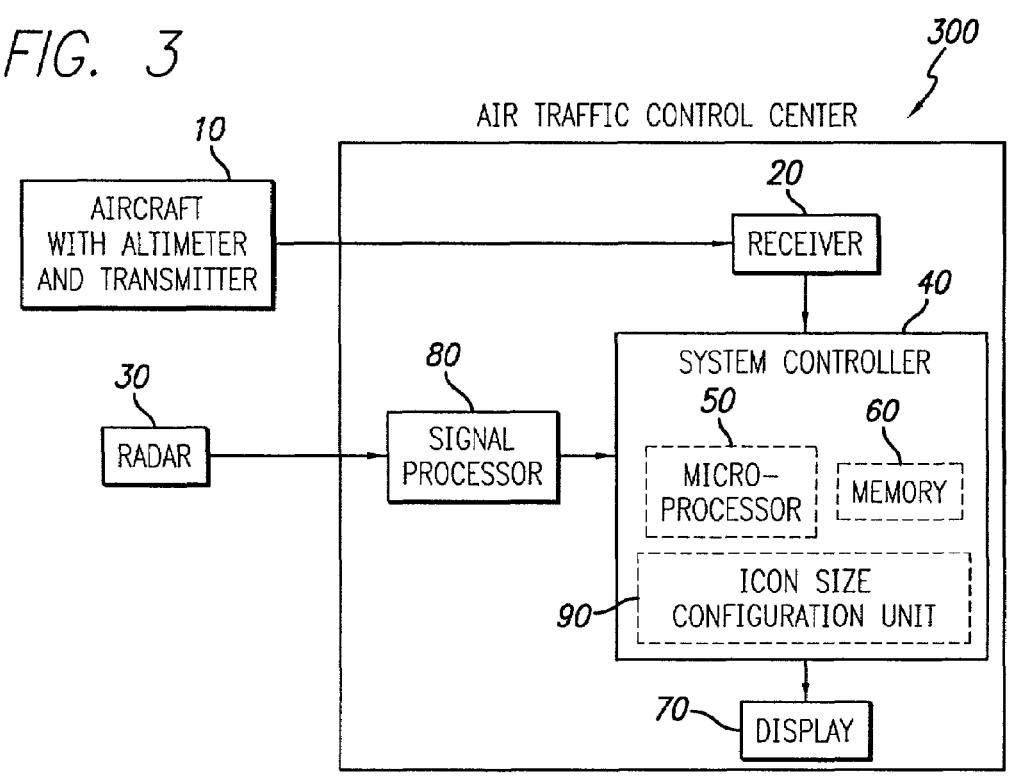
FIG. 3 is a block diagram of a system for conveying aircraft altitude in accordance with the teachings of the present invention.

FIG. 3 is a block diagram of an air traffic control system 300 designed in accordance with the teachings of the present invention. Aircraft 10 with an on-board altimeter and transmitter sends altitude information to a receiver 20 at the air traffic control center. Alternatively, altitude information may be obtained from a radar 30, which is processed by a signal processor 80. The altitude information is sent to a system controller 40, which includes a microprocessor 50 and memory 60, where the altitude information is converted to an icon size by an icon size configuration unit 90. In the preferred embodiment, the icon size configuration unit is implemented in software residing in the system memory 60 and executed by the microprocessor 50. An icon of the appropriate size is then displayed on a display 70.

The icon size can be determined by a look-up table or by a mathematical formula. For this particular embodiment, the following table was used to determine icon size:

| Aircraft Altitude (ft.) | Icon Length (mm) |
| --- | --- |
| under 17,500 | 5 |
| 17,500-22,500 | 7 |
| 22,500-27,500 | 9 |
| 27,500-32,500 | 11 |
| over 32,500 | 14 |

Five discrete icon sizes of length 5, 7, 9, 11, and 14 mm were used to represent five distinct altitude ranges, centered at 15-, 20-, 25-, 30-, and 35,000 ft., respectively. The smallest icon size represented the lowest altitude range while the largest icon size represented the highest altitude range. Those skilled in the art will appreciate that an inversely correlated relationship between icon size and altitude such that the smallest icon size represents the highest altitude range while the largest icon size represents the lowest altitude range could be employed without departing from the scope of the present teachings. Further, the number of icon sizes is not limited to five. Any number of icon sizes can be used, as long as they are discriminable by a human observer. Discriminability can be determined by psychophysical experiments.

Figure 4:
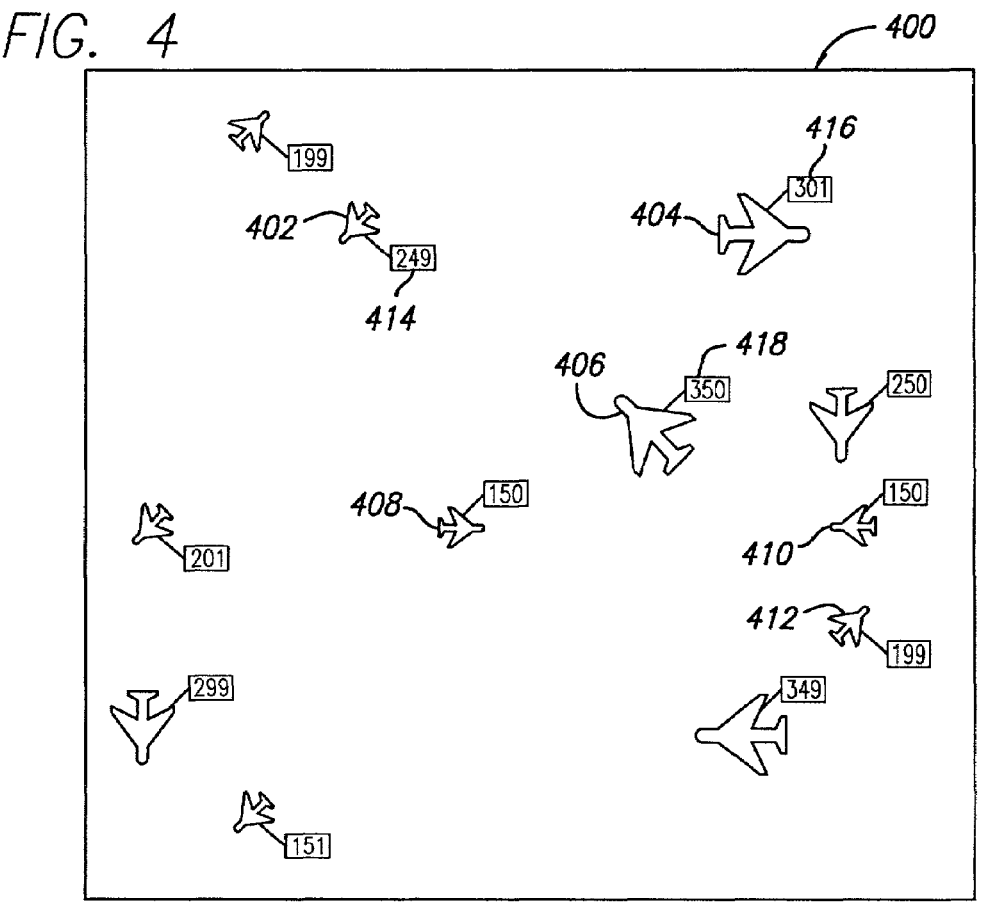
FIG. 4 is a simulated plan view display in accordance with the teachings of the present invention.

FIG. 4 is a simulated plan view of a display 400 implemented in accordance with the teachings of the present invention. Each aircraft position and heading is plotted as the location and orientation of an icon 402, 404, 406, etc. in two-dimensional space, the axes of which represent latitude and longitude. In the illustrative embodiment, five icon sizes 408, 412, 402, 404, and 406 depict five approximate altitude ranges (15-, 20-, 25-, 30-, and 35,000 ft., respectively). The altitude of each aircraft is also displayed as a number in a data block 414, 416, 418, etc. with the associated aircraft icon 402, 404, 406, etc., respectively. Two of the aircraft 408 and 410 shown in this simulated plan view display are seen to be in conflict (at 15,000 ft.). Altitudes represented numerically in data blocks are not necessary for the correct use of this invention. Aircraft 408 and 410 can be determined to be in conflict without any numerical altitudes in the display.

Figure 5:
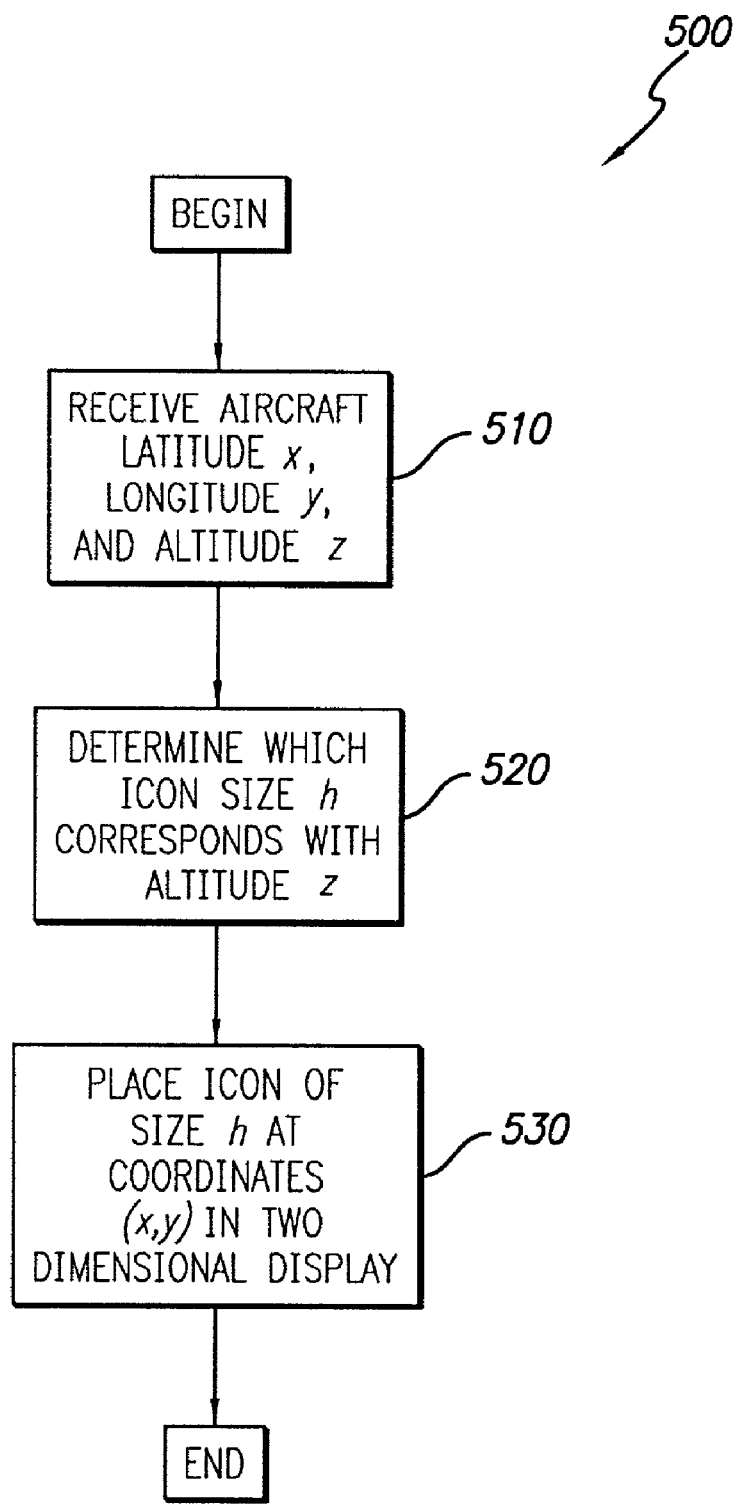
FIG. 5 is a flow diagram of an algorithm for representing aircraft altitude by icon size in accordance with the teachings of the present invention.

FIG. 5 is a flow diagram of a method for representing aircraft altitude by icon size in accordance with the teachings of the present invention. At step 510, aircraft latitude x, longitude y, and altitude z are obtained from radar or transmission by the aircraft. At step 520, an icon size h is chosen which corresponds with the aircraft altitude z. The icon size can be determined by a look-up table or by a mathematical formula. At step 530, an icon of size h is plotted on a two dimensional display at coordinates (x,y).

Visualizing aircraft altitude using the spatial size of icons is a more effective means of identifying altitude ranges and detecting potential collisions. This takes advantage of human perceptual ability to discriminate size among many objects in a visual scene and perform rapid analog comparisons, as opposed to reading digital numbers and making several numerical comparisons. The number of numerical computations is greatly reduced. Candidates for numerical comparison can be determined based on image size, thus obviating or greatly reducing the number of pairwise comparisons necessary to accurately assess the air traffic situation. Conflicts can thus be anticipated with far less cognitive demand. Candidates for numerical comparison can be determined based on image size comparisons alone. However, numerical comparisons can be possible if numerical altitudes are available in the display.

The present invention is not limited to representation by the size of an icon. Any variable characteristic of the icon such as size, shape, color, or intensity can be used. Using size as a cue is an intuitive analog representation of altitude. Objects that are further away naturally seem smaller, while closer objects are larger. Similarly, objects that are further away seem lighter, while closer objects are darker. Thus, the intensity (or grayscale level) of the icon might also be a good characteristic for representing altitude. Moreover, differences and similarities in grayscale, color, or shape are encoded efficiently and in parallel in the human visual system.

While the present invention has been described with reference to an air traffic control application for conveying altitude information about aircraft, it should be understood that the invention is not limited to this application. This invention could be used to convey location information about any object, such as depth of a submarine in the ocean, or distance to a target.

In addition, the axes of the two dimensional display are not limited to representing latitude and longitude, and the size of the icon is not limited to representing altitude. For example, the axes of the display could represent height and width, while the size of the icon represents the distance of a target to the observer.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A system for conveying aircraft altitude to a human observer, the system comprising:
   a processor continuously receiving latitude, longitude, and altitude information relating to an aircraft, the altitude information including information enabling determination of a numeric value for an altitude for the aircraft, wherein the processor determines, based on the numeric value of the altitude information, a shape for an icon representing the aircraft, wherein the shape is associated with at least a distinct numeric altitude range and is the sole displayed indicator of the numeric value of the altitude of the aircraft; and
   a display in operable communication with the processor, the display providing a two-dimensional planar view and having a first axis representing latitude and a second axis representing longitude, wherein the processor directs the display to present the icon at a position on the display indicative of the latitude and longitude of the aircraft, wherein the shape of the displayed icon is the sole displayed indicator of information indicating at least a numeric range for the altitude of the aircraft, and wherein the processor directs the display to change the shape of the icon in response to receiving a change in the altitude information.

2. The system of claim 1, wherein the processor receives altitude information from the aircraft itself.

3. The system of claim 1, wherein the processor receives altitude information from a radar.

4. The system of claim 1, wherein the value is associated with a distinct numeric value of altitude for the aircraft.

5. The system of claim 4, wherein the shape is associated with the distinct numeric value of altitude for the aircraft.

6. The system of claim 1, wherein the shape is selected from a predetermined number of discriminably different shapes.

7. The system of claim 1, wherein the shape of the icon has a continuously variable relationship with the value of the altitude information.

8. A method of conveying location of an object, the methoc comprising:
   receiving location information continuously regarding the object, the location information including a first coordinate x, a second coordinate y, and a third coordinate z, wherein the third coordinate z represents a value associated with a numeric value for an altitude of the object;
   correlating the first and second coordinates (x,y) with a location of an icon on a display, the display providing a two-dimensional planar view and having a first axis representing the x coordinate and a second axis representing the y coordinate;
   correlating the third coordinate z with a shape of the icon, wherein the icon shape is associated with at least a distinct numeric altitude range and is exclusively indicative, on the display, of the value of the third coordinate z; and
   displaying the icon on the display, wherein the shape of the displayed icon changes in response to received changes in the value of the third coordinate z, and wherein the displayed icon has a position on the display indicative of the first and second coordinates (x,y).

9. The method of claim 8, wherein the shape of the icon is selected from a predetermined number of discriminably different shapes, each respective shape associated with at least a distinct numeric altitude range.

10. The method of claim 8, furhther comprising receiving location information regarding the object from the object itself.

11. The method of claim 8, further comprising receiving location information regarding the object from a radar.

12. A method of conveying aircraft information visually to a user, the method comprising:
   continuously receiving latitude, longitude, and altitude information relating to an aircraft;
   selecting an icon to represent one of latitude, longitude, and altitude, wherein the shape of the icon, by itself, is capable of conveying visually to a user at least a range of numeric values for the selected one of latitude, longitude, and altitude information;
   presenting the icon to a user on a display, wherein the shape of the icon is the only way that information about at least the range of numeric values for the respective one of latitude, longitude, and altitude information is visually conveyed to the user, and wherein the icon is presented on a position on the display indicative of the other two of latitude, longitude, and altitude of the aircraft; and
   in response to receiving a change in the respective one of latitude, longitude, and altitude information, changing the shape of the icon, wherein the change in shape is discriminable to the user, and wherein the change shape of the icon, by itself, is the only way the change in the value of the respective one of latitude, longitude, and altitude information is visually conveyed to the user.

13. The method of claim 12, wherein the shape of the icon, by itself, is capable of conveying visually to a user a distinct numeric value for the selected one of latitude, longitude, and altitude information.

14. The method of claim 12, wherein the shape of the icon has a continuously variable relationship with the range of numeric values.

* * * * *

UNITED STATES PATENT AND TRADEMARK OFFICE
CERTIFICATE OF CORRECTION

PATENT NO. : 7,408,552 B2  Page 1 of 1
APPLICATION NO. : 10/071670
DATED : August 5, 2008
INVENTOR(S) : Philip J. Kellman et al.

It is certified that error appears in the above-identified patent and that said Letters Patent is hereby corrected as shown below:

Title Page, Item (57) Abstract, line 3, delete "two dimensional" and replace with -- two-dimensional --.

Col. 1, line 58, delete "two dimensional" and replace with -- two-dimensional --.

Col. 2, line 55, delete "two dimensional" and replace with -- two-dimensional --.

Col. 2, line 58, delete "icon" and replace with -- icons --.

Col. 4, line 6, delete "icon" and replace with -- icons --.

Col. 4, line 20, delete "two dimensional" and replace with -- two-dimensional --.

Col. 4, line 56, delete "two dimensional" and replace with -- two-dimensional --.

Col. 5, line 45, delete "methoc" and replace with -- method --.

Col. 6, line 42, delete "change" and replace with -- changed --.

Signed and Sealed this

Second Day of December, 2008

JON W. DUDAS
*Director of the United States Patent and Trademark Office*